United States Patent [19]

Matsumura et al.

[11] 3,925,291

[45] Dec. 9, 1975

[54] AQUEOUS ACRYLONITRILE POLYMER SOLUTION CONTAINING THIOCYANATE AND AMIDE COMPOUND

[75] Inventors: Yasuo Matsumura; Shoichi Takeuchi, both of Okayama, Japan

[73] Assignee: Japan Exlan Co., Ltd., Osaka, Japan

[22] Filed: Oct. 24, 1973

[21] Appl. No.: 411,324

[30] Foreign Application Priority Data
Nov. 1, 1972    Japan............................ 47-109615

[52] U.S. Cl................ 260/29.6 AN, 260/29.6 AB, 260/29.6 AQ; 260/29.6 MN; 260/29.6 R; 260/29.6 MQ; 260/80.73; 260/80.81; 264/182
[51] Int. Cl.²......................................... C08L 33/20
[58] Field of Search........... 260/29.6 AN, 29.6 AQ, 260/29.6 AI, 29.6 T, 29.6 R

[56] References Cited
UNITED STATES PATENTS

| | | | |
|---|---|---|---|
| 2,648,648 | 8/1953 | Stanton et al................ | 260/29.6 AN |
| 2,806,010 | 9/1957 | Wheatley et al............ | 260/29.6 AQ |
| 2,843,558 | 7/1958 | Fujisaki et al.............. | 260/29.6 AQ |
| 3,402,235 | 9/1968 | Henderson et al.......... | 260/29.6 AN |

*Primary Examiner*—Harold D. Anderson
*Attorney, Agent, or Firm*—Wenderoth, Lind & Ponack

[57] ABSTRACT

An acrylonitrile polymer solution having good spinnability and good transparency comprising a halogen-containing acrylonitrile co-polymer, and a solvent therefor consisting of 30 % to 60 % by weight of thiocyanate, 25 % to 55 % by weight of water and 5 % to 45 % by weight of a specific chain of cyclic compound having an amide or urea skeleton.

9 Claims, No Drawings

AQUEOUS ACRYLONITRILE POLYMER SOLUTION CONTAINING THIOCYANATE AND AMIDE COMPOUND

The present invention relates to acrylonitrile polymer solutions for producing acrylic shaped articles having high flame retardancy. More particularly, the invention relates to such a method wherein in producing shaped articles such as fibers, films and the like from an acrylonitrile copolymer containing acrylonitrile, a vinyl halide and/or vinylidene halide, a mixed solvent consisting of a thiocyanate, water and a specific organic compound is used as the solvent for the copolymer.

More specifically, the present invention relates to an acrylonitrile polymer solution consisting essentially of 5 to 25% by weight, based on the weight of the solution, of an acrylonitrile co-polymer consisting of at least 40% by weight, based on said copolymer, of acrylonitrile, 10 to 50% by weight, based on said copolymer, of vinyl halide, vinylidene halide or mixtures thereof and 0% to 15% by weight, based on said copolymer, of one or more ethylenically unsaturated compounds, and a solvent consisting of 35% to 50% by weight, based on the solvent, of an inorganic thiocyanate and 30 to 50% by weight based on the solvent, of water and 10 to 35% by weight, based on the solvent, of at least one of the organic compounds shown by the following general formulae (I), (II) and (III):

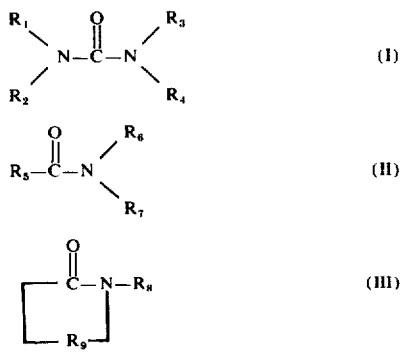

wherein each of $R_1$ through $R_8$ is hydrogen or an alkyl group, $R_9$ is an alkylene group, the sum of the carbon atoms of $R_1$, $R_2$, $R_3$ and $R_4$ and the sum of the carbon atoms of $R_5$, $R_6$ and $R_7$ are each less than 4, and the sum of the carbon atoms of $R_8$ and $R_9$ is less than 8.

It is known that acrylonitrile copolymers containing vinyl halide and/or vinylidene halide such as vinyl chloride, vinylidene chloride, etc. (halogen-containing monomer) as a copolymeric component are very useful as materials for forming shaped articles such as fibers, films, etc., particularly in producing flame retardant shaped articles. The degree of flame retardancy of shaped articles obtained from acrylonitrile copolymers containing such halogen-containing monomer depends on the content of the halogen-containing monomer in the flame retardant polymer. That is to say, shaped articles obtained from an acrylonitrile copolymer with an increased content of halogen-containing monomer represent an increased flame retardant effect.

However, while such acrylonitrile copolymers containing a great amount of halogen-containing monomer are soluble in organic solvents such as dimethylformamide, γ-butyrolactone, etc., they are difficultly soluble in a concentrated aqueous solution of a thiocyanate, i.e. an inorganic solvent. Therefore, it has been difficult to form shaped articles such as fibers, films, etc. from the foregoing acrylonitrile copolymers containing halogencontaining monomer by the use of a concentrated aqueous solution of thiocyanate as the solvent.

Under the circumstances, we made a research to overcome the foregoing disadvantage. As a result, we have achieved the present invention by the discovery that an aqueous thiocyanate solution containing a specific chain or cyclic compound having the amide or urea skeleton represents an unexpectedly high dissolving ability for acrylonitrile copolymers copolymerized with a large amount of a vinyl halide and/or vinylidene halide.

Therefore, the main object of the present invention is to obtain solutions of haloven-containing acrylonitrile polymers for producing acrylic shaped articles having a high degree of flame retardancy.

An object of the present invention is to produce homogeneous solutions of halogen-containing acrylonitrile polymers having good spinnability and good transparency.

Another object of the present invention is to produce shaped articles such as fibers, films, etc. in an industrially advantageous manner from acrylonitrile copolymers containing a vinyl halide and/or vinylidene halide as a copolymeric component by the use of a mixed solution prepared by the addition of a specific organic compound to an aqueous solution of a thiocyanate.

Further objects of the present invention will become apparent from the concrete explanation of the invention that follows.

These objects of the present invention can be attained by the dissolution of an acrylonitrile copolymer containing less than about 50 percent by weight of a vinyl halide and/or vinylidene halide into a mixed solvent consisting of a 30 % to 60 % by weight of a thiocyanate, 25 % to 55 % by weight of water and 5 % to 45 % by weight of at least one of the organic compounds represented by the following formulas (I), (II) and (III):

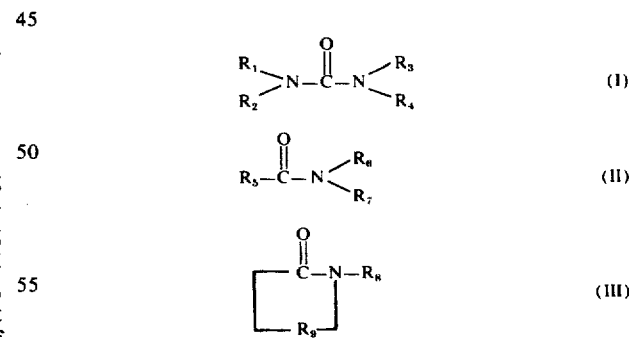

wherein each from $R_1$ through $R_8$ is hydrogen or an alkyl group, $R_9$ is an alkylene group, the sum of the carbon atoms of $R_1$, $R_2$, $R_3$ and $R_4$ and the sum of the carbon atoms of $R_5$, $R_6$ and $R_7$ are each less than 4 , and the sum of the carbon atoms of $R_8$ and $R_9$ is less than 8.

The range as specified above of the mixed solvent composition is the essential requirement for the attainment of the objects of the present invention. A solution containing an amount out of that range of a thiocyanate or one of the foregoing organic compounds cannot perfectly dissolve acrylonitrile copolymers copolymerized with a vinyl halide and/or vinylidene halide. (Because of the occurrence of such problems as cloudiness, undissolved gel, etc., a uniform, homogeneous solution cannot be obtained.) The addition of a greater amount of one of the foregoing organic compounds or a thiocyanate makes it difficult to prepare a solution of the object composition because of the limited solubility of these compounds in water. Even when the preparation of such a solution is successful, on account of an extremely high concentration of the solution, the spinning solution obtained by the dissolution of the foregoing polymer with such a solution will be unstable to solidify upon storage — a trouble in practical use that makes such a spinning solution undesirable. The objects of the present invention can be more satisfactorily attained when the composition of the mixed solvent according to the invention is fixed such that the proportion of thiocyanate:water:organic compound is 35-50:30-50:10-35 (% by weight).

By the use of the mixed solvent according to the present invention, even an acrylonitrile copolymer copolymerized with a considerable amount, for example about 50 % by weight, of a vinyl halide and/or vinylidene halide can be easily dissolved to form a homogeneous solution having good spinnability and transparency. However, with the conventional concentrated aqueous solution of a thiocyanate as the solvent, when the proportion of such a halogen-containing monomer in the copolymer is in excess of about 10 % by weight, it has been extremely difficult to prepare a homogeneous solution having an ability sufficient to produce shaped articles in viewpoint of practice. Thus, as contrasted to the process using the conventional concentrated aqueous solution of thiocyanate by which the flame retardancy of the shaped articles is far from what people at present desire to be, the industrial significance of the present invention should be highly evaluated which has made it possible to dissolve the acrylonitrile copolymers copolymerized with a large amount of the halogen-containing monomer by the use of an aqueous thiocyanate solution property-modified with a specific organic compound according to the present invention, whereby the production technique of acrylic shaped articles such as fibers, films, etc. having high flame retardancy has been established.

While it is not known for certain whey in the mixed solvent according to the present invention the specific organic compounds can modify the properties of the aqueous solution of thiocyanate to surprisingly improve the dissolving ability for the acrylonitrile copolymers copolymerized with the halogen-containing monomer, a possible supposition is that the cohesive energy density of the mixed solvent, by virtue of its subtle porportion of one of the foregoing organic compounds, thiocyanate and water, conforms to the cohesive energy density of the polymer. However, the present invention is not limited by such a supposition.

The acrylonitrile copolymers used in the present invention are those copolymerized with a vinyl halide and/or vinylidene halide in an amount of less than about 50 % by weight, preferably less than 40 % by weight. They may be ternary or polycomponent polymers into which up to 15 % by weight, preferably up to 10 % by weight, of one or more ethylenically unsaturated copolymerizable compounds is introduced as a third component, as required. Desirably, the content of acrylonitrile in the copolymer is generally more than 40 % by weight, preferably more than 50 % by weight. Also, it is desirable that the lower limit of content of vinyl halide and/or vinylidene be generally more than about 5 % by weight, preferably more than 10 % by weight to confer sufficient flame retardancy on the object shaped articles. Especially, the effect of the present invention becomes more marked when an acrylonitrile copolymer copolymerized with a great amount of a vinyl halide and/or vinylidene halide is used.

As the vinyl halides and/or vinylidene halides to be introduced into such acrylonitrile copolymers may be mentioned vinyl chloride, vinyl bromide, vinylidene chloride, vinylidene bromide, etc. The ethylenically unsaturated compounds to be introduced as copolymeric components as required include all the known unsaturated compounds such as unsaturated carboxylic acids, e.g. acrylic acid, methacrylic acid, itaconic acid, maleic acid, etc.; acrylic esters, e.g. methyl acrylate, ethyl acrylate, butyl acrylate, octyl acrylate, hydroxyethyl acrylate, methoxyethyl acrylate, phenyl acrylante, cyclohexyl acrylate, dimethylaminoethyl acrylate, etc.; methacrylic esters, e.g. methyl methacrylate, ethyl methacrylate, butyl methacrylate, octyl methacrylate, hydroxyethyl methacrylate, methoxyethyl methacrylate, phenyl methacrylate, cyclohexyl methacrylate, dimethylaminoethyl methacrylate, etc.; amides of acrylic and methacrylic acids or their N-alkyl substituted products; unsaturated ketones, e.g. methyl vinyl ketone, phenyl vinyl ketone, methyl isopropenyl ketone, etc.; vinyl esters of saturated carboxylic acids, e.g. vinyl formate, vinyl acetate, vinyl propionate, vinyl butyrate, vinyl thiolacetate, vinyl benzoate, etc.; N-alkylmaleinimides, N-vinylcarbazol, N-vinylsuccinimide, N-vinylphthalimide, vinylether; vinylpyridines, e.g. 2-vinylpyridine, 4-vinylpyridine, 2-methyl-5-vinylpyridine, etc.; styrene and its alkyl-substituted products; allylalcohol; unsaturated sulfonic acids, e.g. allylsulfonic acid, methallylsulfonic acid, styrene sulfonic acid, etc. and their salts; cyclic compounds, e.g. beta-propiolactone, etc.; unsaturated aldehydes, e.g. accolain, metacrolein, etc.; phosphorus-containing unsaturated compounds, e.g. diethylvinyl phosphonate, diphenylvinylphosphine, etc.; methacrylonitrile, etc.

As the compounds represented by the foregoing general formulas (I), (II) and (III), which are essential for the mixed solvent of the present invention, can be mentioned; urea, ethylene urea, N-methylurea, sym-dimethylurea, unsym-dimethylurea, formamide, acetamide, propionamide, N-methylformamide, N-methylacetamide, N-methylpropionamide, N,N-dimethylformamide, N,N-dimethylacetoamide, N,N-dimethylpropionamide, butyrolactam, caprolactam, etc.

However, the use of the compounds not satisfying the limiting conditions of the general formulas does not lead to the formation of a homogeneous phase of the three components, i.e. a said organic compound, thiocyanate and water, and therefore the preparation of the mixed solvent system according to the present invention is then unsuccessful.

. Among the thiocyanate used in the present invention, sodium thiocyanate, potassium thiocyanate, calcium thiocyanate, and ammonium thiocyanate are particularly effective.

As the method of preparing the acrylonitrile polymer solutions according to the present invention, any method may be used provided that a homogeneous solution can be obtained eventually. For instance, a method wherein the acrylonitrile polymer and the mixed solvent are mixed in the usual way, heated as required, to dissolve the mixture in one step or in multiple steps; a method wherein the components of the mixed solvent are added separately or at the same time; or a continuous dissolving method as mentioned in Japanese Pat. No. 7146/1972 can be used. A modification of the method of the present invention is a method wherein acrylonitrile and the foregoing vinyl halide and/or vinylidene halide are polymerized in the mixed solvent of the present invention. The polymer concentration in the polymer solution thus prepared is generally 3 % to 30 % by weight, preferably 5 % to 25 % by weight. The addition to the polymer solution, of various anticoloring agents to prevent the coloring of the solution, or various agents such as ultraviolet absorbing agents, heat stabilizing agents, antistatic agents, etc. to impart desirable properties to the shaped articles is permissible.

The following examples are given for a better explanation of the invention and not for limiting the scope of the invention. The percentages and parts in the examples are by weight unless otherwise specified.

EXAMPLE 1

Ten parts of a copolymer consisting of 60.5 % acrylonitrile and 39.5 % vinylidene chloride obtained by the polymerization of a monomer mixture of acrylonitrile and vinylidene chloride by the ordinary aqueous suspension polymerization method using the sodium chlorate/sodium sulfite redox initiator, was mixed with 90 parts of a mixed solvent consisting of 30 % ε-caprolactam, 40 % sodium thiocyanate and 30 % water and stirred under heating at a temperature of 60°C. A homogeneous polymer solution was obtained which had a good transparency and spinnability.

Also, by the use of the foregoing mixed solvent consisting of 30 % ε-caprolactum, 40 % sodium thiocyanate and 30 % water, homogeneous polymer solutions completely free from cloudiness and undissolved gel could be prepared from two ternary copolymers consisting of acrylonitrile, vinylidene chloride and methyl acrylate in the ratio (%) of 62.0/33.4/5.6 and 68.0/24.5/7.5.

On the other hand, three kinds of solvents consisting solely of sodium thiocyanate and water in the ratio (%) of 40/60, 50/50 and 60/40 were prepared. Ninety parts of these solvents and ten parts of the foregoing three kinds of polymers were mixed and stirred at 70°C. for one hour. In each case, the dissolution of the polymer was not observed at all.

In a similar way, attempts were made to dissolve the foregoing three kinds of acrylonitrile copolymers with solutions consisting of ε-caprolactam and water in the ratio (%) of 90/10, 80/20, 70/30, 60/40, 50/50 and 40/60. In each case, the polymer did not dissolved in the least.

A copolymer consisting of acrylonitrile and vinylidene chloride in the ratio (%) of 60.5/39.5 could be dissolved in solutions consisting of dimethylformamide and water in the ratio (%) of 100/0 and 90/10, but not completely in a solution consisting of dimethylformamide and water in the ratio of 80%/20%, and did not dissolved in the least in solutions containing less than 70 % dimethylformamide. On the other hand, the copolymer dissolved in a mixed solvent system consisting of dimethylformamide, sodium thiocyanate and water in the ratio (%) of 40/40/20 but did not dissolve in the least in mixed solvent systems of a larger content of dimethylformamide, such as those having the ratio (%) of 50/30/20, 60/20/20 and 70/10/20.

The foregoing results shows that the mixed solvent systems according to the present invention form a peculiar combination state of the components to develop a surprising effect which cannot be expected from the dissolving ability of the respective components constituting the system. It is evident that the mixed solvent systems according to the present invention are those of an entirely new class, since they contain a small amount of a compound, e.g. ε-caprolactam, which by itself is a complete non-solvent, or a compound, e.g. dimethylformamide, which even though can act as a solvent singly, loses its dissolving ability at low concentrations.

EXAMPLE 2

The ε-caprolactam in Example 1 was replaced with propionamide, N-methylacetamide, N,N-dimethylacetamide, N,N-dimethylpropionamide, N-methylurea, sym-dimethylurea, acetamide, urea, ethylene urea or γ-butyrolactam. Ninety parts of various solutions consisting of each one of the foregoing organic compounds, sodium thiocyanate and water in the ratio (%) of 30/40/30 was mixed with ten parts of a copolymer consisting of 68.0 % acrylonitrile, 24.5 % vinylidene chloride and 7.5 % methyl acrylate, and heated at 60°C. under stirring. Various polymer solutions of good transparency and uniformity were obtained.

Also, a copolymer consisting of 45.0 % acrylonitrile, 50.2 % vinyl chloride and 4.8 % methyl acrylate; 71.7 % acrylonitrile, 18.3 % vinylidene chloride and 10 % vinyl bromide; or 79.5 % acrylonitrile, 11.0 % vinyl bromide and 9.5 % acrylamide was mixed with a mixed solvent consisting of 30 % ε-caprolactam, 40 % sodium thiocyanate and 30 % water. A copolymer consisting of 59 % acrylonitrile, 32 % vinylidene chloride and 9 % acrylamide; or 85.4 % acrylonitrile, 5.4 % vinyl bromide and 7.8 % vinyl acetate, was mixed with a mixed solvent consisting of 15 % ε-caprolactam, 45 % sodium thiocyanate and 40 % water. These mixtures were heated at 60°C. under stirring to obtain transparent polymer solutions completely free from undissolved gel.

EXAMPLE 3

Three kinds of acrylonitrile copolymers consisting of acrylonitrile, vinylidene chloride and methyl acrylate in the ratio (%) of 65.0/27.6/7.4, 68/24.5/7.5 and 72.3/21.6/6.6 were dissolved respectively in the same way as in Example 1 in a solvent consisting of ε-caprolactam, sodium thiocyanate and water of the ratio in percent of 15/45/40, to prepare spinning solutions. Each of the thus obtained spinning solutions was extruded through a spinnerette having 100 orifices, the diameter of each orifices being 0.09 mm., into a coagulating bath consisting of 5 % ε-caprolactam, 15 % sodium thiocyanate and 80 % water at 10°C. The filaments thus formed, after being washed with water, were stretched 12 times the initial length in boiling water, thereafter heated dry at 120°C. and relaxed wet at 120°C. Thus, three kinds of acrylic synthetic fibers were obtained which had tensile strength of 2.7, 3.0 and 2.9 g/d and tensile elongation of 33.3, 35.6 and 41.0 %, respectively. These vinylidene chloride-containing acrylic synthetic fibers were observed to have a markedly improved flame retardancy in comparison with the ordinary acrylic synthetic fiber.

What we claim is:

1. An acrylonitrile polymer solution consisting essentially of 5 to 25% by weight, based on the weight of the solution, of an acrylonitrile co-polymer consisting of polymerized units from at least 40% by weight, based on said copolymer, of acrylonitrile, 10 to 50% by weight, based on said copolymer, of vinyl halide, vinylidene halide or mixtures thereof and 0% to 15% by weight, based on said copolymer, of one or more ethylenically unsaturated compounds, and a solvent consisting of 35% to 50% by weight, based on the solvent, of an inorganic thiocyanate and 30 to 50% by weight based on the solvent, of water and 10 to 35% by weight, based on the solvent, of at least one of the organic compounds shown by the following general formulae (I), (II) and (III):

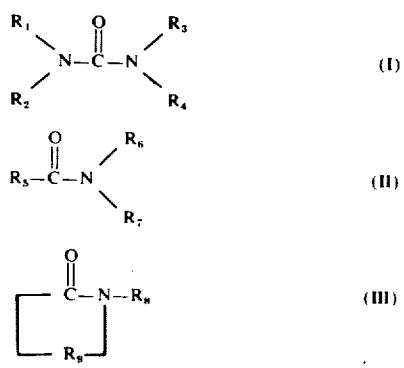

wherein each from $R_1$ through $R_8$ is hydrogen or an alkyl group, $R_9$ is an alklene group, the sum of the carbon atoms of $R_1$, $R_2$, $R_3$ and $R_4$ and the sum of the carbon atoms of $R_5$, $R_6$ and $R_7$ are each less than 4, and the sum of the carbon atoms of $R_8$ and $R_9$ is less than 8.

2. The acrylonitrile polymer solution according to claim 1 wherein the acrylonitrile copolymer consists of polymerized units from 68% acrylonitrile, 24.5% vinylidene chloride and 7.5% methyl acrylate.

3. The acrylonitrile polymer solution as in claim 1 wherein said acrylonitrile copolymer contains polymerized units from 10 to 40 % by weight of vinyl halide, vinylidene halide or mixture thereof.

4. The acrylonitrile polymer solution as in claim 1 wherein the vinyl halide is selected from the group consisting of vinyl chloride and vinyl bromide.

5. The acrylonitrile polymer solution as in claim 1 wherein the vinylidene halide is selected from the group consisting of vinylidene chloride and vinylidene bromide.

6. The acrylonitrile polymer solution as in claim 1 wherein the organic compound shown by the general formula (I) is selected from the group consisting of urea, N-methylurea, sym-dimethylurea and unsym-dimethylurea.

7. The acrylonitrile polymer solution as in claim 1 wherein the organic compounds shown by the general formula (II) is selected from the group consisting of formamide, acetamide, propionamide, N-methylformamide, N-methylacetamide, N-methylpropionamide, N,N-dimethylformamide, N,N-methylpropionamide, and N,N-dimethylpropionamide.

8. The acrylonitrile polymer solution as in claim 1 wherein the organic compounds shown by the general formula (III) is selected from the group consisting of butyrolactam and caprolactam.

9. The acrylonitrile polymer solution as in claim 1 wherein the thiocyanate is selected from the group consisting of sodium thiocyanate, potassium thiocyanate, calcium thiocyanate and ammonium thiocyanate.

* * * * *